Aug. 1, 1972     C. M. MASON     3,681,028
UNDERWATER GAS DETECTION SYSTEM
Filed Aug. 31, 1970
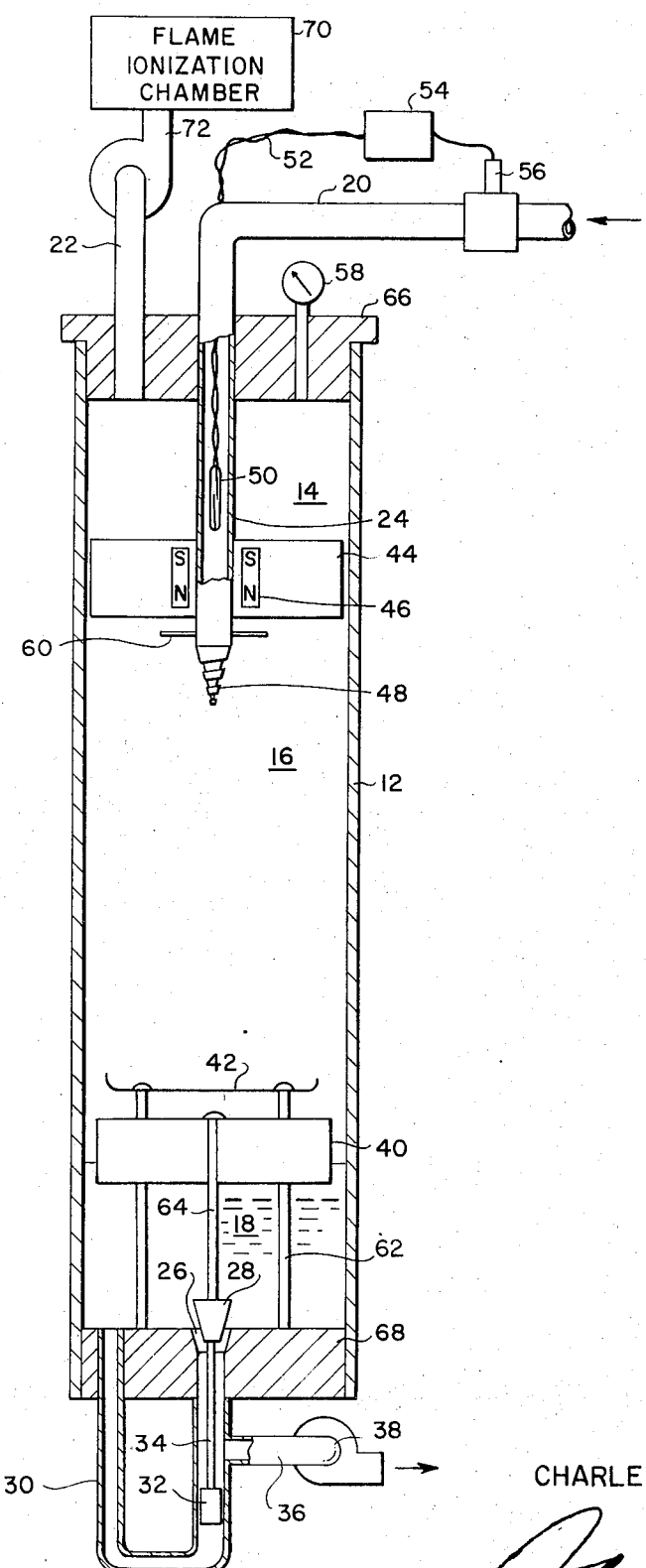
INVENTOR
CHARLEY M. MASON
*John E. Holder*
ATTORNEY United States Patent Office 3,681,028
Patented Aug. 1, 1972

3,681,028
UNDERWATER GAS DETECTION SYSTEM
Charley Mack Mason, Denton, Tex., assignor to Sun Oil Company (Delaware), Dallas, Tex.
Filed Aug. 31, 1970, Ser. No. 68,285
Int. Cl. B01d 19/00; G01n 1/24, 33/24
U.S. Cl. 23—253 R
19 Claims

ABSTRACT OF THE DISCLOSURE

In a hydrocarbon detection system for use in an exploration survey over water covered areas, samples of water are taken, in which hydrocarbon gases may appear in a dissolved state. Removal of dissolved gas from the sample is accomplished by admitting the sample to a chamber, passing it through a fog nozzle, and applying a vacuum to remove the gas from the sample, thus creating fog, liquid, and gas zones in the chamber. Gas is removed from the top and liquid is discharged from the bottom of the chamber by pumps. Valves are located in the liquid entrance line and the de-gassified liquid exit line, and are controlled by liquid level responsive devices. The removed gas is subjected to analysis.

BACKGROUND OF THE INVENTION

This invention relates to a gas detection system and more particularly, to a gas detection system for use in locating subterranean petroleum deposits in water covered areas.

Various methods are practiced in the exploration for petroleum deposits in areas covered by water. Seismic methods have been used for locating and outlining subsurface structures which exhibit characteristics similar to previously discovered petroleum-containing structures. Additionally, measurements of gravimetric, magnetic, and radioactive properties have been made which may be indicative of petroleum deposits. The methods hereinabove discussed all are indirect indicators of petroleum deposits. A more direct method of determining the location of a petroleum deposit involves the detection and/or measurement of elements or compounds resulting from one or more constituents of a petroleum deposit seeping to the surface. One method of exploration in water covered areas is the subject of U.S. Pat. No. 2,918,579, entitled "Exploration for Petroliferous Deposits by Locating Oil or Gas seepage." Such patent describes a system for continuously sampling water removed from the area being explored, continuously removing the gaseous components from such samples, continuously analyzing that gas for preselected gases, recording a parameter of the concentrations of said preselected gas, and relating the recorded parameter with the location of the sample to produce a map of the area. This procedure has been generally described as hydrocarbon sniffing, and is similar to collecting samples of soil gas at onshore locations to determine the presence of hydrocarbon gases as well as gases associated with or emitted by other natural resources such as mercury. In operation of such hydrocarbon sniffer for use in water covered areas, the equipment must be calibrated to determine the background reading for such hydrocarbon gases to serve as a basis for a comparison with readings made while traversing an area. Due to the diffusion of hydrocarbon gas seepage in the water, traverses may be made which are separated more than traverses which would normally be required in a comparable soil gas sampling method. Methane is the gas normally selected for detection, since it is the most abundant gas associated with petroleum deposits which readily seeps to the surface. Due to air currents which disperse and laterally move such hydrocarbon seeps, extracting gases from the air above the water is unsatisfactory, therefore it is necessary to take the gas sample by removing a sample of the water so that the source of the seep can be more accurately be determined. Since there are also currents located in waters such as oceans and large lakes, more accurate locating of the origin of the hydrocarbon seep is obtained by removing a sample of water as close as possible to the bottom of the body of water. Since samples taken from a continuously moving vessel covers the most area in the shortest time, it is preferable to use water samples located between the surface and the bottom of the water. It is conceivable that once high indicia of hydrocarbon gases is found, soil samples may be desired, i.e., samples taken from the soil located at the bottom of the water. It is an object of the present invention to provide a gas detection system having improved apparatus for separating gases from a gas-containing fluid sample.

SUMMARY OF THE INVENTION

With this and other objects in view, the present invention contemplates apparatus for removing dissolved gas from a liquid in a hydrocarbon detection system. The apparatus includes a chamber having a liquid sample inlet at the end of which is a liquid disperser for quick release of the dissolved gas under the influence of a vacuum created by a pump supplying a hydrocarbon detection unit. The liquid disperser is located so as to create a vapor zone in the top of the chamber, a fog zone in the mid portion of the chamber, and a liquid zone at the lower end of the chamber.

BRIEF DESCRIPTION OF THE DRAWING

The figure 1 is a cross-sectional elevational view of a hydrocarbon detection system.

DESCRIPTION OF THE PREFERRED EMBODIMENTS

The figure shows an apparatus for use in a hydrocarbon seep detection exploration system that continuously extracts gas from a liquid fed thereto. The apparatus includes a housing 12 which is a hollow cylinder, preferably make of a rigid clear material such as plastic. The hollow cylindrical housing 12 is closed at each end by an upper cap 66 and a lower cap 68, which are also preferably made of a clear rigid material. Extending through the upper cap 66 is water inlet conduit 20, which has a portion extending into the interior of the housing generally describing a downcomer pipe 24. Located in the portion of the water inlet conduit 20 exterior to the housing 12 is a solenoid valve 56, which is controlled by actuating device 54, which in turn is initiated by closure of reed switch 50 located in the downcomer pipe portion 24. Reed switch 50 has a pair of normally separated electrical contact arms which come into contact when under the influence of a magnetic field. Electrical lines 52 connect the reed switch 50 with the actuating device 54. Float 44 slidably attached to the down comer pipe portion 24 of liquid inlet conduit 20 has magnets 46 located therein. Upper float 44 may be constructed of any suitable material, such as Styrofoam, which floats on both sea water and fresh water. Retainer 60 is secured to the lower portion of the downcomer pipe portion 24 of liquid inlet conduit 20 and retains upper float 44 on such downcomer pipe portion 24. This retainer 60 may be made of any long lasting preferably rigid material which can be welded or bonded to the downcomer pipe portion 24, or secured by other conventional means such as a set screw.

A fog nozzle 48 is secured to the end of the downcorner pipe portion 24, and also can be made of any durable metal or long-lasting synthetic material. This fog nozzle, as depicted, is in the form of a spiral having a cone shaped bore therethrough. The bore is largest near the attachment to the downcomer pipe portion 24 and decreases as it extends outwardly from said downcomer pipe 24.

A line 22 connects the interior of housing 12 with flame ionization chamber 70 used here to determine the magnitude of specific components of a gas. Pump 72 is located in said line 22, and pulls a vacuum on the interior of housing 12. Mounted atop upper cap 66 is vacuum gauge 58, which communicates with the interior of housing 12 and is used to determine the effectiveness of the pump 72 in maintaining the vacuum in housing 12.

Opening 26 located in the lower cap 68 communicates with discharge pump 38 via conduit 36. Valve 28 is connected to lower float 40 by cylindrical rod 64, and is adapted to partially close opening 26. This valve is in the form of an inverted truncated cone such that the further it travels downwardly in the opening 26, the snugger it fits therein. Also connected to valve 28 by the lower rod section 34 of cylindrical rod 64 is cylindrically shaped piston 32, which is located in pressure equalization passageway 30, extending from the housing 12 to the discharge side of opening 26, and is positioned below conduit 36 connecting liquid discharge pump 38 with opening 26. Mounted above lower float 40 is baffle and stop tray 42, which is secured to the lower cap 68 by baffle tray and stop retainer rods 62. Lower float 40 may be constructed of any appropriate lighter than water material, such as a hollow metal or a synthetic material having a multiplicity of air pockets therein. Baffle tray and stop 42 and related rods 62 are preferably made of a metallic material, as is cylindrical rod 64 attached to float 40 as well as valve 28 and piston 32. The baffle tray and stop 42 is a flat preferred sheet capable of passing a liquid therethrough. The lower float 40 should therefore have sufficient buoyancy to overcome the weight of cylindrical rod 64 and valve 28 and piston 32 attached thereto.

In the operation of the de-gassing apparatus, the pump 72 is started which draws liquid into liquid inlet conduit 20, whereupon it descends downcomer pipe portion 24 thereof. Upon passing from the lower end of downcomer pipe portion 24, the incoming liquid, containing dissolved gas therein, passes through fog nozzle 48, which is attached at the lower end of downcomer pipe 24. Since the bore of the nozzle 48 is cone shaped and therefore becomes more restrictive as the gas passes therethrough, the outer portions of the liquid stream are severed from the remainder of the liquid stream by the spiral edges interposed in its path and are fanned outwardly, thereby creating a fog. Upon fogging of the liquid, the dissolved gas tends to become separated therefrom. This separation is enhanced by the vacuum exerted in the housing 12 by pump 72, which communicates with the housing 12 through line 22 extending through upper cap 66. To determine if such pump 72 is operating properly, vacuum gauge 58 is mounted atop upper cap 66, and communicates with the interior of housing 12. A vacuum of 23 to 26 inches of mercury is suitable for the operation of this de-gassifying apparatus. As the gas is removed from the liquid, it exits the housing 12 through line 22 in response to the vacuum exerted by the pump 72, and is fed to a flame ionization chamber 70 wherein hydrocarbon content is determined. The flame ionization chamber 70 has a hydrogen and oxygen feed to supply a flame adjacent a platinum conductor connected with a voltage responsive indicator. A battery having one pole connected with the indicator and the other pole connected with the platinum through the flame. The hydrogen-oxygen flame is non-conductive to electrical current until a carbon containing component is introduced with the hydrogen stream. The flame then becomes conductive because of ionization of the combustion products. The amount of ionization is indicative of the amount of carbon present. A portion of the gas removed from the liquid is extracted and fed to a chromatograph which is not shown, to determine specific hydrocarbon components. The de-gassified liquid descends the interior of housing 12 to the lower portion of said housing. Therefore, the use of fog nozzle 48 creates three distinct zones in the interior of housing 12. In the upper portion of the housing is a vapor zone generally indicated at 14, below which is a fog zone indicated at 16, and located at the bottom of the housing is liquid zone, indicated at 18. This system affords compact construction of the apparatus; therefore it is easily transportable and requires minimal space aboard a vessel being used for such exploration techniques. Besides compactness, the fog zone allows such rapid removal of gases from the incoming liquid that lag time is reduced, i.e., the time between extraction of a liquid sample until determination of the components and amount of certain gases in such sample. This time factor is important if analysis of the sample is to keep up with the rate of sample taking desired.

A valve 28 capable of closing off opening 26 in lower cap 68 is positioned in the liquid zone 18. As liquid enters the housing, it accumulates at the lower end thereof and would obstruct operation of the de-gassifier if it accumulated until it rose above the fog nozzle 48. Therefore, lower float 40 is attached to valve 28 by cylindrical rod 64. Thus when excessive water is located in the interior of housing 12, valve 28 is opened by the action of lower float 40 which is buoyed up when the liquid reaches the level of such float 40. Float 40 is limited in its upward travel by baffle tray and stop 42, which is secured to the lower cap 68 by rigid baffle tray and stop rods 62. This baffle tray and stop 42 also protects the lower float 40 from any downward force of liquid emitted by fog nozzle 48 which would have a tendency to overcome the buoyant force of the water on the lower float 40. This baffle tray and stop 42 preferably has a multiplicity of openings therethrough to permit the passage of liquid to the liquid zone 18 in the lower end of the housing 12. Lower float 40 also may have vertical passages therethrough for further facilitating such liquid passage.

Discharge pump 38 located adjacent the lower end of the housing 12 continuously exerts a pumping action against the opening 26 through conduit 36 for the purpose of degassified liquid removal. If valve 28 is seated in opening 26 the discharge pump 38 would tend to hold it in place by exerting a vacuum on the underside of the valve 28. Liquid in the lower end of the housing 12 also exerts a hold-down force on the valve 28. In order to neutralize the hold-down force and vacuum lock, a pressure equalization passageway 30 is utilized, together with piston 32 which is rigidly attached to and separated from valve 28. This pressure equalization passageway 30 extends from the liquid zone 18 of housing 12 to the discharge side of opening 26. This passageway equalizes the pressure across the opening 26 caused by the liquid in housing 12. The piston 32 offsets the vacuum effect of the discharge pump 38, since the vacuum will also be applied to the piston 32 exerting an upward force on valve 28 because of the rigid attachment between the valve 28 and piston 32. Additionally, the piston 32 prevents water from being pumped through passageway 30 by discharge pump 38 since it acts as a blocking element. Piston 32 is always located below conduit 36, whether the valve 28 is in an open or closed position with respect to opening 26. If the piston were allowed to rise above or adjacent to the conduit 36, the removal of liquid could be accomplished only through the pressure equalization passageway 30, assuming the action of the discharge pump is not negated completely by the piston 32 closing off conduit 36.

In the event of malfunction of the valve 28 or the inability of opening 26 to pass sufficient water therethrough, an upper float 44 is attached to and arranged for slidable movement on downcomer pipe portion 24 of liquid inlet conduit 20. Retainer 60, fixedly attached to downcomer pipe 24 prevents such upper float 44 from falling from said downcomer pipe portion 24. Embedded in the upper float 44 preferably made of a material such as Styrofoam, are magnets 46. If the liquid accumulates in the housing 12 to such a level that it lifts this upper float 44, the magnets contained therein will rise to the area of reed switch 50. At such time, the magnets through magnetic forces close said reed switch 50. Upon closure of reed switch 50, a circuit is closed which energizes actuating device 54 which activates solenoid valve 56 to close liquid inlet conduit 20. Actuating device 54 may be designed to re-open solenoid valve 56, upon recession of the liquid in the interior of the housing as indicated by the opening of reed switch 50, or a manual reset may be used, thereby affording visual inspection of the de-gassifying system before resuming operation.

As described, the embodiment shown in the figure has several advantages. First, the utilization of a fog nozzle allows for extremely efficient de-gassifying using compact equipment. Also because of the valving arrangement in the liquid discharge, the discharge pump 38 and pump 72 need not be balanced. Additionally, the apparatus involved is inexpensive and easily assembled.

In the general operation of this de-gassifying apparatus as it relates to general hydrocarbon exploration in water covered areas, de-gassifying apparatus together with related hydrocarbon detectors are mounted on a vessel. The liquid inlet conduit 20 is lowered into the water to any desired depth including placing it on the floor of the body of water. For sampling while the boat is moving, the end of the liquid inlet conduit 20 is positioned between the surface of the water and the floor of the body of water to allow movement without damage to the liquid conduit. Movement of the vessel is desired in order to quickly traverse an area to be surveyed. The hydrocarbon detector is calibrated and background readings are taken before and during traverses. As gas is fed into the hydrocarbon detector, amounts in excess of the background level are noted and its location pinpointed. This information can then be used for immediate further testing or for a more detailed survey at some later time. It is preferable to use a combination of a flame ionization chamber and a chromatograph in order to determine not only the magnitude of hydrocarbon content but also the amounts and types of hydrocarbons present.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

I claim:

1. Apparatus for detecting the presence of hydrocarbon gases in water covered areas comprising: means for extracting samples of such water; a degassing chamber having a vapor zone in its upper end, a water zone in the lower end, and a fog zone between such vapor and water zones; means for admitting such water sample to said degassing chamber fog zone; fog nozzle means located at the upper end of the fog zone for dispersing the water sample in said fog zone; vacuum means for extracting gases from said vapor zone; and means for analyzing such gases for hydrocarbon content.

2. The apparatus of claim 1 wherein said fog nozzle is attached to the lower end of said water sample admission means.

3. The apparatus of claim 1 including water discharge means located adjacent the lower end of said water zone.

4. The apparatus of claim 3 including valve means located in said water discharge means and means responsive to the liquid level in said chamber for controlling the operation of said valve means, wherein said valve control means is located adjacent the water zone-fog zone interface.

5. The apparatus of claim 4 wherein the water discharge means includes an opening in the water zone of the chamber, a passageway extending from said opening, and pump means connected to said passageway and thereby communicating with said opening.

6. The apparatus of claim 5 including means for equalizing the pressure across the opening in said chamber.

7. The apparatus of claim 6 wherein the pressure equalization means includes a conduit extending between the water zone of the chamber and the discharge side of the opening in said chamber.

8. The apparatus of claim 7 including piston means positioned in said pressure equalization means and means for connecting the piston means with said valve means in a manner resulting in the piston means being spaced from and rigidly connected with said valve means and wherein said valve control means comprises a float member which is attached to said valve means.

9. Apparatus for detecting gaseous hydrocarbon seeps in water covered areas comprising: means for extracting continuous samples of such water; chamber means having a vapor zone in its upper end, a water zone at its lower end, and a fog zone between such water and vapor zones; means for admitting such water sample to said chamber means; fog nozzle means for dispersing the water sample, located adjacent the fog zone-vapor zone interface; means for extracting gases released from such water dispersion; and means for determining the amounts of certain hydrocarbon constituents contained in such extracted gases.

10. The apparatus of claim 9 including valve means located in said water admission means and liquid sensitive means located in said fog zone, for closing said valve means.

11. The apparatus of claim 10 wherein the water admission means comprises a downcomer pipe extending from the top of the chamber and through the gas zone, and wherein the liquid sensitive means comprises a float member slidably attached to said downcomer pipe, having magnets located in said float member, and a reed switch located in said gas zone which is responsive to the magnets located in the float member and which is connected to actuating means for operating said valve means.

12. The apparatus of claim 9 including means for discharging water from said chamber.

13. The apparatus of claim 12 including first valve means located in said water discharge means and means responsive to the liquid level in said chamber for controlling said first valve means.

14. The apparatus of claim 13 wherein the water discharge means comprises an opening in the liquid zone of the chamber and pump means communicating with said opening.

15. The apparatus of claim 14 wherein the valve means comprises: a plug member shaped to seal the opening in said water discharge means; piston means located in said water discharge means; and means for connecting the piston means with said plug member arranged so that the piston means is spaced from said plug member.

16. The apparatus of claim 15 wherein the valve control means comprises a float member attached to the plug member, wherein said float member rises and falls with the water level in said chamber, and including stop means for restricting upward movement of said float member and which also acts as a baffle to prevent the force of the water entering the chamber from forcing the float member downwardly.

17. The apparatus of claim 15 wherein the water discharge means includes pressure equalization means comprising a passageway from the water zone to the discharge side of the chamber opening and wherein the piston is located in such passageway.

18. The apparatus of claim 13 including second valve means located in said water sample admission means and means responsive to the liquid level in the chamber for controlling said second valve means.

19. The apparatus of claim 18 wherein said second valve means is a solenoid valve and said second valve control means comprises a float member located in said chamber, magnets contained in said float member, switch means responsive to a magnetic field located in the upper portion of said chamber, and means responsive to closure of said switch means for activating said solenoid valve.

References Cited

UNITED STATES PATENTS

| | | | |
|---|---|---|---|
| 2,918,579 | 12/1959 | Slobod et al. | 23—230 EP X |
| 3,455,144 | 7/1969 | Bradley | 23—230 EP X |
| 2,571,219 | 10/1951 | De Cew | 55—55 X |
| 2,685,937 | 8/1954 | Clark et al. | 55—55 X |
| 2,998,056 | 8/1961 | Capehart | 137—433 X |
| 3,351,084 | 11/1967 | Halkiades | 137—416 |
| 3,408,053 | 10/1968 | Vantroba | 137—416 X |

JOSEPH SCOVRONEK, Primary Examiner

U.S. Cl. X.R.

23—230 EP, 254 E; 55—55, 189; 73—19, 170 A; 137—412, 423, 433